United States Patent [19]

Lang

[11] Patent Number: 5,022,986
[45] Date of Patent: Jun. 11, 1991

[54] MANIFOLD AND DISPOSABLE FILTER ASSEMBLY

[76] Inventor: John Lang, 6800 Shingle Creek Pkwy., Brooklyn Center, Minn. 55430

[21] Appl. No.: 463,619
[22] Filed: Jan. 11, 1990
[51] Int. Cl.[5] ............................................. B01D 35/30
[52] U.S. Cl. ..................................... 210/94; 210/232; 210/249; 210/440; 210/444; 210/450; 210/453; 210/455
[58] Field of Search ................. 210/94, 232, 248, 249, 210/282, 288, 440–445, 453, 455, 238, 422, 423; 55/498, 500, 502, 509, 510

[56] References Cited

U.S. PATENT DOCUMENTS

| 2,059,358 | 11/1936 | Johnson et al. | 210/440 |
| 3,067,880 | 12/1962 | Bowers et al. | 210/249 |
| 3,225,929 | 12/1965 | Sicard | 210/453 |
| 3,397,135 | 8/1968 | Otto | 210/444 |
| 3,399,776 | 9/1968 | Knuth | 210/420 |
| 3,727,764 | 4/1973 | Ogden | 210/232 |
| 3,842,870 | 10/1974 | Burgess | 210/444 |
| 3,880,757 | 4/1975 | Thomason | 210/443 |
| 4,228,011 | 10/1980 | Cote | 210/232 |
| 4,507,203 | 3/1985 | Johnston | 210/445 |
| 4,544,387 | 10/1985 | Agerlid | 210/94 |
| 4,591,438 | 5/1986 | Tanabe et al. | 210/282 |
| 4,735,716 | 4/1988 | Petrucci et al. | 210/423 |
| 4,814,078 | 3/1989 | Stern et al. | 210/440 |
| 4,824,564 | 4/1989 | Edwards et al. | 210/248 |

OTHER PUBLICATIONS

The Consumers Report publication.
The Freshwater Foundation publication.

Primary Examiner—Robert A. Dawson
Assistant Examiner—Mathew O. Savage
Attorney, Agent, or Firm—Burd, Bartz & Gutenkauf

[57] ABSTRACT

A fluid filtering assembly has a manifold connectable to a line carrying fluid and a filter cartridge releasably connected to the manifold. The manifold has a pair of pockets that accommodate fluid inlet and outlet tubular members on the filter cartridge. Seals associated with the pockets and tubular members retain the fluid to the manifold and filter cartridge. A releasable connector holds cartridge in assembled relation with the manifold.

48 Claims, 9 Drawing Sheets

MANIFOLD AND DISPOSABLE FILTER ASSEMBLY

FIELD OF INVENTION

The invention relates to apparatus for separating products and chemicals from fluids with the use of filters. The apparatus has a quick change disposable filter cartridge mounted on a manifold which directs fluid into and out of the filter cartridge.

BACKGROUND OF THE INVENTION

Fluid treatment systems use disposable filters to separate chemicals, particles and odors from liquids and gases. In the past, various structures have been used to filter liquids. These structures include under-sink water filters having a generally cylindrical housing attached to a top manifold. The housing accommodates a filter cartridge that should be replaced at regular intervals. The under-sink unit is permanently mounted into the water line so that a wrench is needed to open the housing. This makes it difficult, burdensome, and time consuming to replace the used filter cartridge with a fresh one. Due to the labor necessary to replace the cartridges, persons would tend to change the cartridges less frequently which would limit the effectiveness of the filter.

Quick change filter canisters and leads are disclosed by Petrucci et al in U.S. Pat. No. 4,735,716. The canisters and heads have cooperating tabs operable to lock and unlock the canisters on the heads in response to rotation of the canisters. The canisters have axial necks containing both fluid inlet and outlet passages. O-ring seals on the necks are turned with the canisters during the coupling of the canisters on the manifolds. The O-ring seals are also directly exposed to the inlet pressure of the fluid. The turning of O-ring seals and direct fluid pressure on the O-ring seals does not ensure an effective seal between the manifolds and filter canisters.

SUMMARY OF INVENTION

The invention is a fluid filter assembly for separating foreign matter, such as chemicals, particulates, salts, minerals, and odors, from a fluid. The fluid can be a liquid, such as water, or a gas. For example, the filter assembly has a disposable filter cartridge for separating and collecting foreign materials from liquid chemicals used to clean and coat eye glass lens. The filter assembly has a manifold adapted to be coupled to fluid inlet and outlet lines. A filter cartridge having a filter is releasably mounted on the manifold so that the filter cartridge can be manually removed and replaced with minimum amounts of time and labor and without the use of tools. The manifold and filter cartridge have cooperating sealing structures that prevent leakage of fluid from the manifold and filter cartridge and yet allow rapid removal and replacement of the filter cartridge relative to the manifold.

The fluid filter assembly is a combined manifold and filter cartridge. The manifold has a housing with fluid inlet and fluid outlet passages separated with a wall. The wall has a hole separated from the inlet and outlet passages extended through the housing. The housing has a plurality of cylindrical inside surfaces surrounding pockets. Each pocket has an open end. Ports in the housing connect the passages with the pockets to direct fluid into and out of the filter cartridge. The filter cartridge has tubular members adapted to fit into the pockets. The tubular members have passages that carry fluid to and from a chamber accommodating a filter operable to separate foreign matter from the fluid flowing through the filter cartridge. Seals mounted on the tubular members are compressed into sealing engagement with the inside surfaces of the housing when the tubular members are located in the pockets and the passages in the tubular members are aligned with the ports. The seals are O-rings under compression to provide a liquid tight relationship between the tubular members and housing. The filter cartridge is releasably retained on the manifold with a releasable connector assembly.

An example of one form of the connector assembly is a post extended through the hole in the wall of the housing. A holder, such as a nut, cooperating with the post and housing positions the tubular members in the pockets and maintains the sealing relationship of the seals between the tubular members and cylindrical inside surfaces. The holder is manually released from the post to allow the filter cartridge to be removed from the manifold. A replacement filter cartridge is mounted on the manifold by moving the post through the hole in the wall and inserting the tubular members in the pockets. This filter cartridge is retained on the manifold by replacing the holder on the post.

Another example of the connector assembly is a U-shaped yoke having a bottom wall engagable with the bottom end of the filter cartridge. A cross bar is connected with pivot members to the upper ends of the yoke. The cross bar is located between the filter cartridge and manifold. A post or threaded bolt connected to the cross bar extends through the hole in the wall of the manifold. A holder, such as a nut, mounted on the post engages the manifold to clamp filter cartridge to the manifold. The yoke forces the cartridge up into the manifold and holds the seals under compression to prevent liquid leakage between the cartridge and manifold. The holder can be released from the post to allow the yoke to pivot away from the filter cartridge whereby the filter cartridge can be removed from the manifold. A replacement filter cartridge is moved linearly into the manifold and retained thereon by securing holder to post to clamp filter cartridge into sealing relationship with the manifold.

One embodiment of the manifold and filter cartridge has a manifold comprising a housing having a fluid inlet passage and a fluid outlet passage opposite the inlet passage. The passages are separated with a wall having a hole spaced from the inlet passage and the outlet passage. The housing includes a bottom having a first flange with a first cylindrical inside surface surrounding a first pocket. The first pocket has an open lower end and an axis generally parallel to the axis of the hole. An inlet port in the housing connects the inlet passage with the first pocket to allow fluid to flow into a filter cartridge. A second flange opposite the first flange on the bottom of housing has a second cylindrical surface surrounding a second pocket. The second pocket has an open lower end and an axis generally parallel to the axis of the hole and axis of the first pocket. The axis of the first pocket is laterally spaced from the hole a distance greater than the distance of the axis of the second pocket from the hole. The outlet port in the housing connects the outlet passage with the second pocket to carry fluid from the filter cartridge. The filter cartridge can have a transparent sleeve surrounding a chamber accommodating a tubular filter to allow visual inspection of the filter. End members joined to opposite ends of the sleeve retain the filter in the chamber. The sleeve can have a cup shape with a bottom wall integral with its side wall. One end member has a pair of tubular members adapted to fit into the first and second pockets. The tubular members have cylindrical outer surfaces that fit into the first and second pockets. Each tubular member has a passage for carrying fluid from the ports into and out of the chamber to filter the fluid flowing through chamber. O-ring seals surround and are mounted on each tubular member. The seals are circumferentially compressed into sealing engagement with the cylindrical inside surfaces of the flanges when the filter cartridge is mounted on the manifold to prevent leakage of fluid and allow rapid removal of the filter cartridge from the manifold. A releasable connector assembly including a post on the one end member is located between the tubular members to mount the filter cartridge on the manifold. The post is parallel to the axis of the tubular members and fits into the hole in the wall of the manifold. The distance between the axis of the post and the axis of the first tubular member is greater than the distance between the axis of the post and the axis of the second tubular member so that the filter can only be mounted on the manifold in one position. The filter can not be placed on the manifold the wrong way or reversed. A releasable nut threaded on the post engages the top of the housing to clamp the filter cartridge on the manifold and retain the tubular members in the pockets and maintain the O-rings in compression sealing relationship with the first and second cylindrical inside surfaces. When the nut is turned off the post, the filter cartridge can be manually removed from the manifold. A replacement filter cartridge is mounted on the manifold by guiding the post through the hole in the wall and inserting the tubular members into the pockets. The nut turned onto the post engages the housing to clamp to filter cartridge on the manifold.

Another embodiment of the manifold and filter cartridge has a releasable connector assembly that includes a yoke around the filter cartridge and a bolt extended through the hole in the wall of the manifold. A cross bar located between the manifold and filter cartridge is pivotally connected to the yoke and secured to the bolt. A releasable nut mounted on a hand knob threaded on the bolt engages the housing to clamp the filter cartridge on the manifold and retain the tubular members in the pockets and maintain the O-rings in circumferential compression sealing relationship with the first and second cylindrical inside surfaces of the cylindrical flanges on the manifold. The upper O-rings are maintained under axial compression to provide a tight seal between the manifold and filter cartridge. When the nut is turned off the bolt, the yoke is moved away from filter cartridge to allow the filter cartridge to be manually removed from the manifold. A replacement filter cartridge is mounted on the manifold by inserting the tubular members into the pockets. The yoke is moved under the filter cartridge and nut turned onto the bolt engages the housing to clamp to filter cartridge on the manifold.

DESCRIPTION OF PREFERRED EMBODIMENTS

Figure 1:
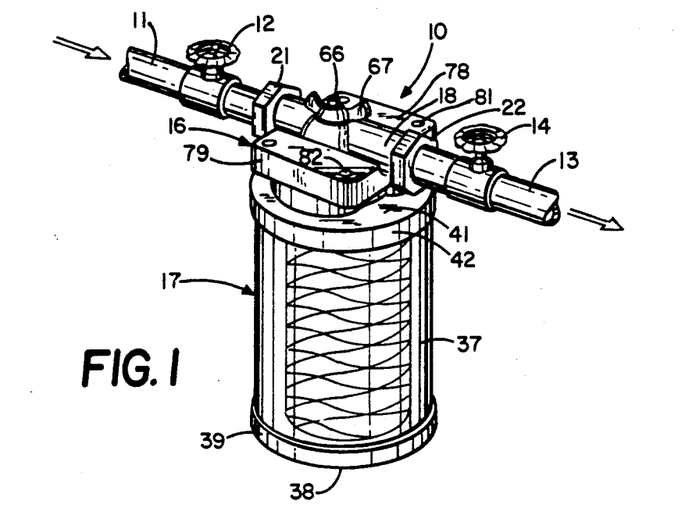
FIG. 1 is a perspective view of the disposable filter and manifold assembly of the invention connected to a fluid carrying pipes.
Figure 2:
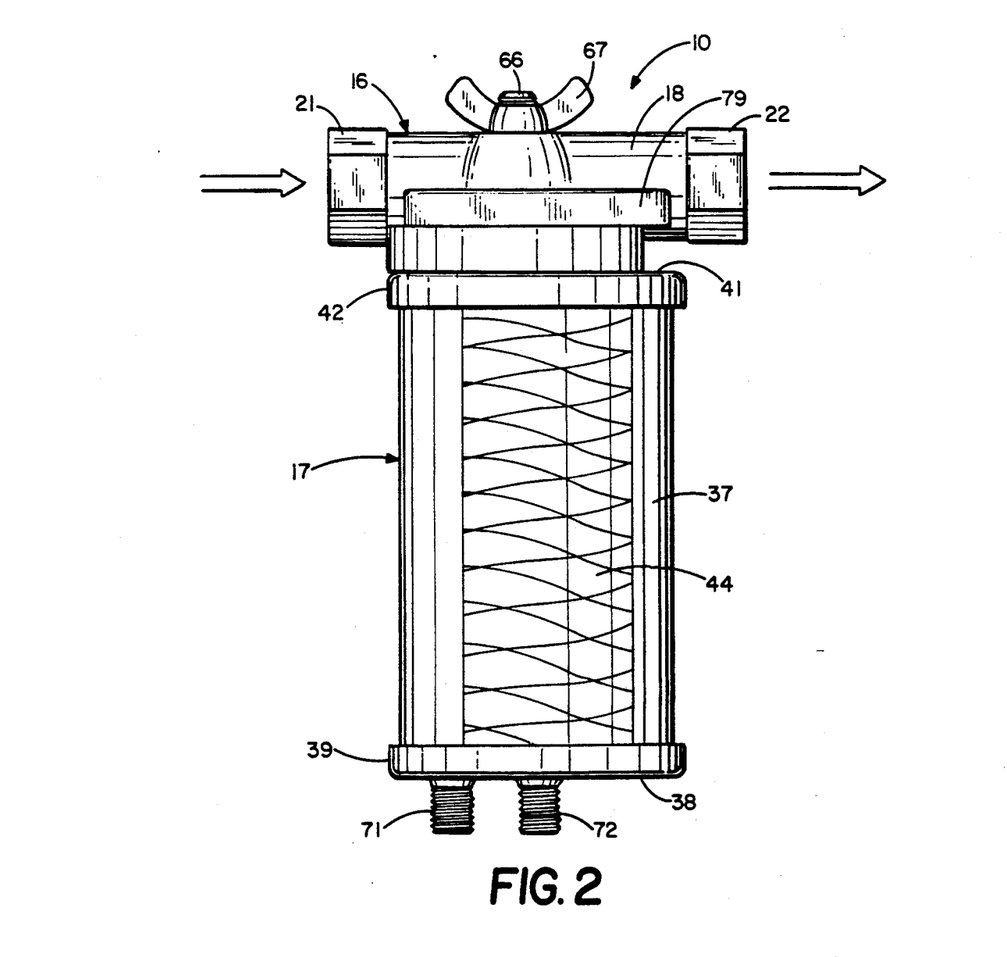
FIG. 2 is an enlarged side elevational view of FIG. 1.
Figure 3:
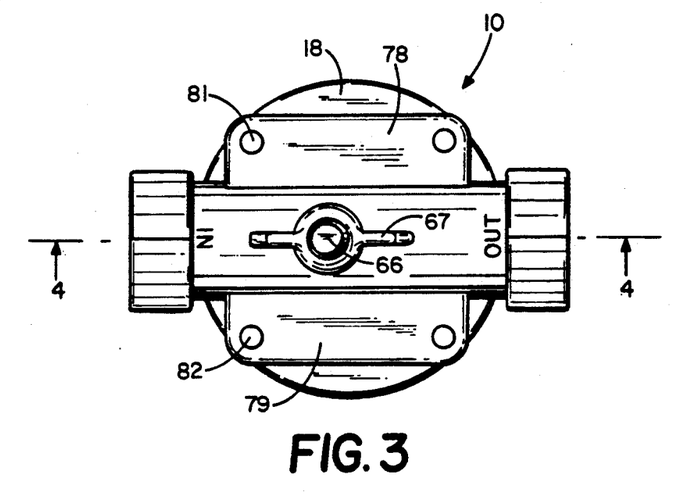
FIG. 3 is a top view of FIG. 2.

Referring to FIG. 1, there shown a filter and manifold assembly of the invention, indicated generally at 10, in operative assembled relation with a fluid inlet line 11 having a shut off valve 12 and a fluid outlet line 13 provided with a shut off valve 14. Valves 12 and 14 can be closed to prevent fluid from flowing through the filter and manifold assembly 10 to permit servicing of the filter cartridge. The filter cartridge of the assembly can then be removed and replaced with a new filter cartridge. Assembly 10 is useable to separate foreign matter from fluids. The fluids can be liquids, including water, or gases. The foreign matter includes chemicals, minerals, salts, particulates, sediments, and odors that are present in fluids.

Filter and manifold assembly 10 has a manifold indicated generally at 16 attached to a disposable filter cartridge indicated generally at 17. Filter cartridge 17 can be disconnected from manifold 16 with a minimum of time and labor without the use of special tools. The fluid within the cartridge can be drained before the cartridge is removed from the manifold. A new filter cartridge can be mounted on the manifold with minimum effort.

Figure 4:
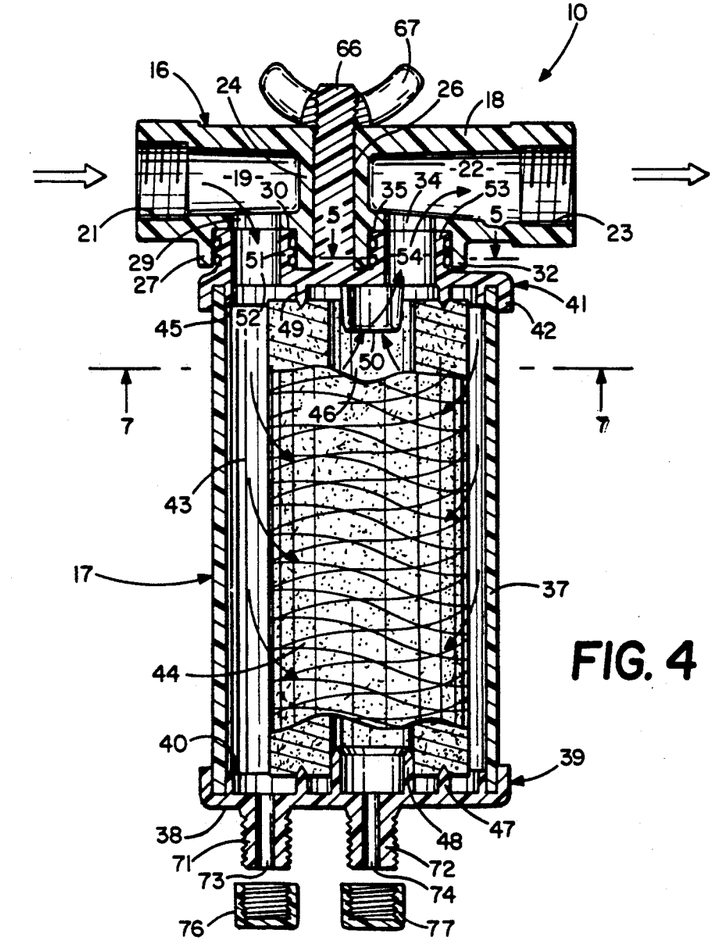
FIG. 4 is an enlarged sectional view taken along the line 4—4 of FIG. 3.
Figure 5:
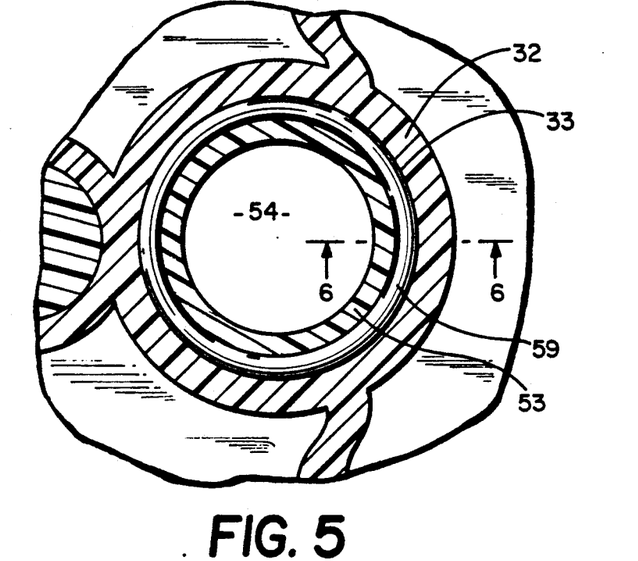
FIG. 5 is an enlarged sectional view taken along the line 5—5 of FIG. 4.

As shown in FIG. 4, manifold 16 has a one piece plastic housing 18 having an inlet passage 19 with an open threaded end 21. The opposite side of housing 18 has an outlet passage 22 with an outlet threaded end 23. Shut-off valves 12 and 14 are joined to lines 11 and 13 to control the flow of fluid into and out of manifold 16. Other types of valves can be used to block the flow of fluid to manifold 16. For example, the shut-off valves can be located within manifold 16. Returning to FIG. 1, inlet line 11, shown as a pipe, is threaded into threaded end 21. Outlet line 13, shown as a pipe, is threaded into outlet threaded end 23. Other types of coupling structures can be used to connect pipes, hoses and like tubes for carrying fluid to and from filter and manifold assembly 10.

Figures 7, 8:
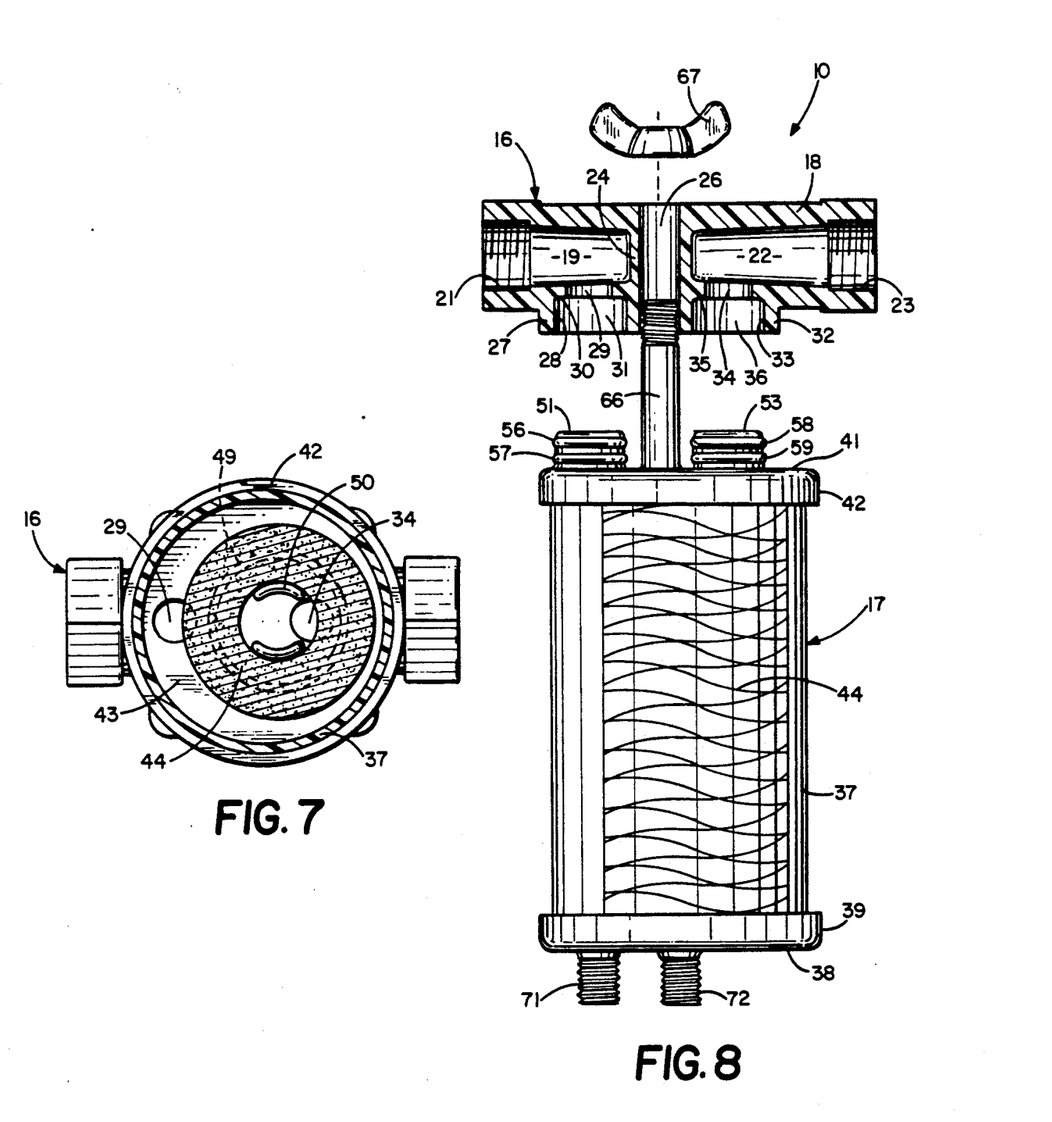
FIG. 7 is a sectional view taken along the line 7—7 of FIG. 4.
FIG. 8 is an exploded side elevational view, partly sectioned, illustrating the procedure to assemble the disposable filter cartridge on the manifold.

As shown in FIGS. 4 and 8, passages 19 and 22 are separated with a central wall 24 having an upright hole 26. Opposite sides of wall 24 separate hole 26 from passages 19 and 22 so that hole 26 is not open to passages 19 and 22. The bottom side of housing 18 has a first cylindrical flange 27 located below passage 19. Flange 27 has a continuous smooth inside cylindrical surface 28 surrounding a downwardly open recess or pocket 31. An inlet port 29 connects inlet passage 19 to recess or pocket 31 surrounded by inside cylindrical surface 28. Pocket 31 is in axial alignment with port 29 and has a diameter greater than the diameter of port 29. An annular shoulder 30 separates cylindrical surface 28 from port 29. The axis of pocket 31 is parallel to the axis of hole 26. The bottom of housing 18 has a second cylindrical flange 32 diametrically opposite first flange 27. Flange 32 has a continuous smooth inside cylindrical surface 33 that surrounds a recess or pocket 36. An outlet port 34 connects outlet passage 22 with pocket 36. The inside cylindrical surface 33 is in axial alignment with port 34 and has a diameter greater than the diameter of port 34. An annular shoulder 35 separates cylindrical surface 33 from port 34. The axis of pocket 31 is parallel to the axis of hole 26 and pocket 31. As shown in FIGS. 4 and 8, the lateral distance between the axis of hole 26 and the axis of pocket 31 is greater than the lateral distance between the axis of hole 26 and the axis of pocket 36. Pocket 31 is off set outwardly relative to pocket 36 and hole 26.

Referring to FIGS. 4 and 8, filter cartridge 17 has a casing 37 shown as an elongated cylindrical sleeve which can be made of transparent material such as plastic, glass or the like. A cup-shape base or first end member 38 is secured to the bottom of casing 37. Base 38 has an upright cylindrical flange 39 that surrounds the bottom of sleeve 37 and an inside rib 40. The lower end of sleeve 37 fits between flange 39 and rib 40 and is secured thereto with suitable bonding material, adhesives or like attaching structure. Opposite sides of housing 18 have flanges 78 and 79 provided with holes 81 and 82. Fasteners, such as bolts and screws, (not shown) extend through holes 81 and 82 to secure manifold 16 to a support. A pair of threaded bosses 71 and 72 project downwardly from the bottom of base 38. Bosses 71 and 72 may have blind holes 73 and 74 respectively. Base 38 can be drilled through holes 73 and 74 to provide passages to the chamber 43 of casing 37. Hole 74 can be opened to the internal passage 46 of filter 44 so that filtered fluid can be drained from cartridge 17 and manifold 16. Hole 73 can be opened to chamber 43 adjacent the outside of filter 44 allowing prefiltered fluid to be drained from chamber 43 and manifold 16. Caps 76 and 77 can be turned on threaded bosses 71 and 72 to close holes 73 and 74. The top of casing 37 is closed with a cap or second end member 41 having a downwardly directed flange 42 that telescopes over the top of casing 37 and an inside rib 45. The upper end of casing 37 fits between flange 42 and rib 45 and is secured thereto with bonding material, adhesives, or like attaching structure. Casing 37, base 38, cap 41 enclose a generally cylindrical chamber 43 for accommodating the fluid flowing through filter cartridge 17.

An elongated cylindrical filter 44 is located in chamber 43. Filter 44 is a tubular member having a lower end that is located on a cylindrical rib 47 and around an inner cylindrical member 48 joined to and extended upwardly from base 38. Cap 41 has a downwardly directed cylindrical rib 49 projected into the upper end of filter 41. Ears 50 extend downwardly from cap 41 adjacent the inside of filter 44. Filter 44 is a cylindrical member having a central longitudinal passage 46. The material of filter 44 can be granular activated carbon, powdered activated carbon, fabric, cotton, paper, plastic, metal, and like filtering materials. The material of filter 44 is selected for the product, chemicals or odors that are to be separated from the fluid flowing through filter cartridge 17.

Figure 6:
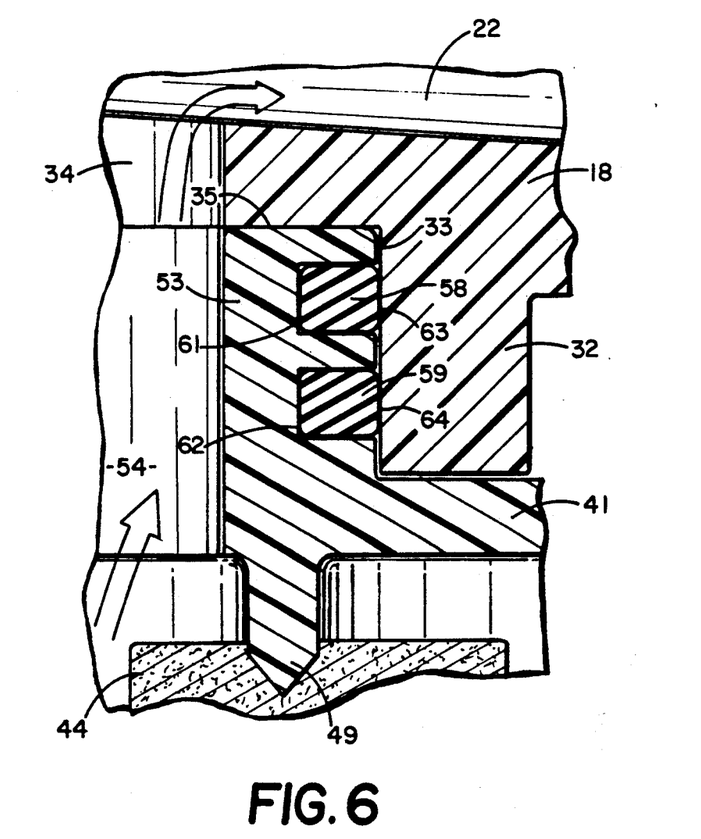
FIG. 6 is an enlarged sectional view taken along the line 6—6 of FIG. 5.

Cap 41 has a pair of upwardly directed cylindrical bosses or tubular members 51 and 53 laterally spaced from each other so as to fit into pockets 31 and 36 of manifold 16. The diameters of tubular members 51 and 53 are slightly smaller than the diameters of inside cylindrical surfaces 28 and 33. The lengths of tubular members 51 and 53 are slightly shorter than the depths of pockets 31 and 36 so that tubular members 51 and 53 freely slide into pockets 31 and 36. Tubular members 51 and 53 and corresponding pockets can have different diameters to ensure correct installation of the filter cartridge 17 on manifold 16. The upper ends of tubular members 51 and 53 abut shoulders 30 and 35 of manifold housing 18. Tubular members 51 and 53 are located on opposite sides of an upwardly directed post 66. The lateral distance between post 66 and tubular member 51 is greater than the lateral distance between post 66 and tubular member 52 so that tubular member 51 only fits into pocket 31 and tubular member 53 only fits into pocket 36. This prevents reverse mounting of cartridge 17 on manifold 16. Bosses 51 and 53 have passages 52 and 54 respectively aligned with inlet port 29 and outlet port 34 of manifold 16. As shown in FIG. 8, a pair of O-rings 56 and 57 surround tubular member 51 and are located in separate annular grooves in tubular member 51 which retain the O-rings on tubular member 51. A pair of O-rings 58 and 59 are located about tubular member 53. As shown in FIG. 6, tubular member 53 has annular grooves 61 and 62 open to the outer side of tubular member 53 accomodating O-rings 58 and 59. Tubular member 54 has similar annular grooves. Grooves 61 and 62 each have a depth less then the diameter of the O-rings 58 and 59 so that the O-rings flattened and are circumferentially compressed when filter cartridge 17 is mounted on manifold 16. As shown in FIG. 6, the outer end of tubular member 53 bears against shoulder 35 and outside surfaces 63 and 64 of O-rings 58 and 59 are compressed into a flat surface engagement with the inside surface 33 of manifold flange 32. The plastic material of tubular member 53 is compressed against shoulder 35 in sealing relation thereto. This effectively seals the cap 41 on manifold housing 18. The O-rings 58 and 59 are in circumferential compressed surface engagement with the inside cylindrical wall 33 of flange 32. The O-rings 56 and 57 are compressed into circumferential continuous engagement with the inside surface 28 of the flange 27. The plastic material of tubular member 51 is compressed against shoulder 30 in sealing relation thereto.

As shown in FIG. 4, filter cartridge 17 is retained on manifold 16 with a releasable connector comprising a threaded rod or post 66 joined to cap 41. Post 66 is located between tubular members 51 and 53 and extends upwardly through the hole 26 in body 18. Post 66 has a diameter slightly smaller than diameter of hole 26 so that it would readily slide through hole 26. When cartridge 17 is moved linearly up onto manifold 16, post 66 guides tubular member 51 into pocket 31 and tubular member 53 into pocket 36. The lateral space relationships between post 66 and tubular members 51 and 53 only allow tubular ember 51 to be inserted into pocket 31 and tubular member 53 to be inserted into pocket 36. Cartridge 17 is not twisted or turned during the assembly of cartridge 17 on manifold 16. A holder, shown as a wing nut 67 threaded on the upper end of post 66, is engageable with the top of housing 18 to clamp filter cartridge 17 on manifold 16. A knob having a threaded bushing can be turned on post 66 to clamp cartridge 17 on manifold 16. Nut 67 when turned down on post 66 holds the upper ends of tubular members 51 and 53 in engagement with shoulders 30 and 35. The O-rings 56, 57 and 58, 59 are not twisted nor turned during the mounting of the filter cartridge 17 on manifold 16 since cartridge 17 linearly moves into assembled relation with manifold 16. This ensures an even effective seal which prevents leakage of fluid from manifold 16. Filter cartridge 17 is removed from manifold by releasing nut 67 from post 66 and pulling cartridge 17 down from manifold 16. Tubular members 51 and 53 retract O-rings 56, 57 and 58, 59 from recesses 31 and 36 in cap 41. A cover (not shown) can be placed over post 66 to close passages 52 and 54 in bosses 51 and 53 so that filter cartridge 17 can be transported to an appropriate disposal site.

Figure 9:
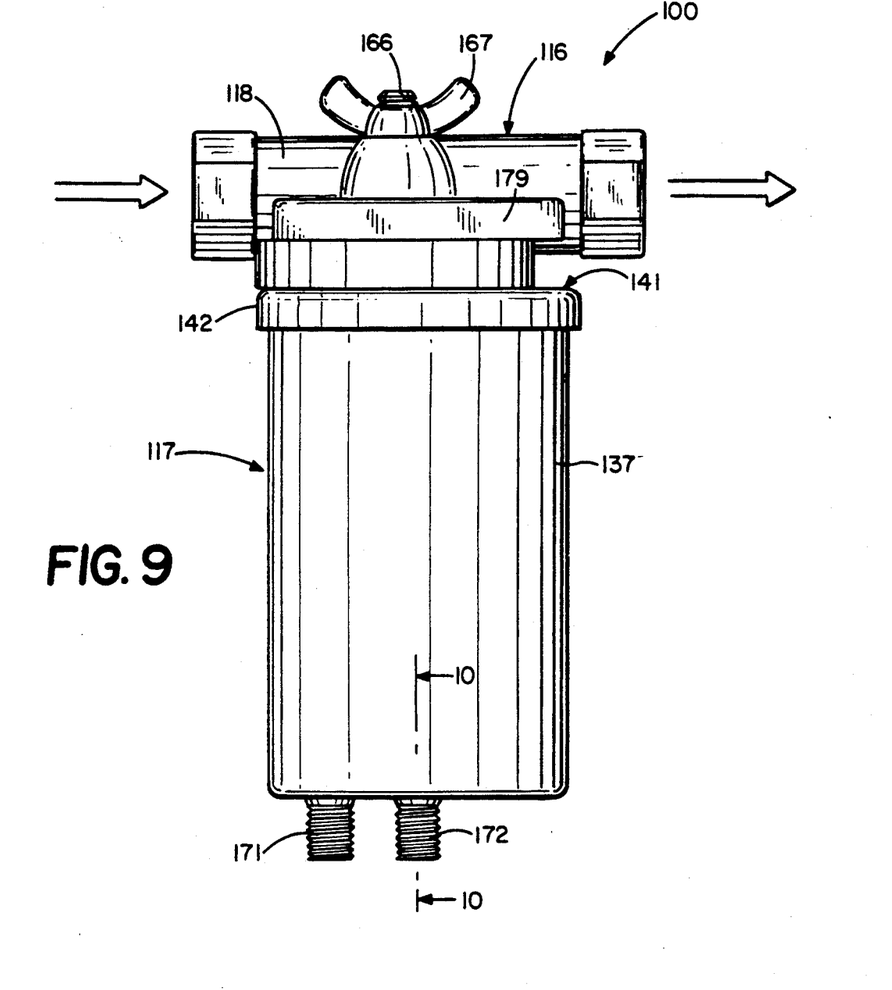
FIG. 9 is a side elevational view of a first modification of the filter and manifold assembly of the invention.
Figure 10:
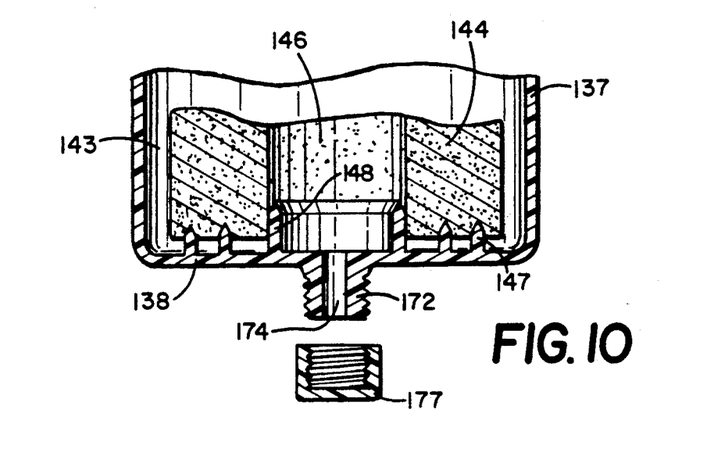
FIG. 10 is an enlarged sectional view taken along line 10—10 of FIG. 9.

A first modification of the filter and manifold assembly indicated generally at 100 is shown in FIGS. 9 and 10. The parts of filter and manifold assembly 100 that correspond to the parts of filter and manifold assembly 10 have the same reference number with a prefix 1. Filter and manifold assembly has a cartridge 117 with an inside chamber 143 for filter 144. Cartridge 117 with an inside chamber 143 for filter 144. Cartridge 117 has a cylindrical side wall or sleeve 137 intergal with a circular bottom wall 138. The cylindrical ribs 147 and 148 and drain bosses 171 and 172 are intergal with bottom wall 138. Cartridge 117 with the bottom wall 138 intergal with side wall 137 can be a one-piece plastic member.

Figure 11:
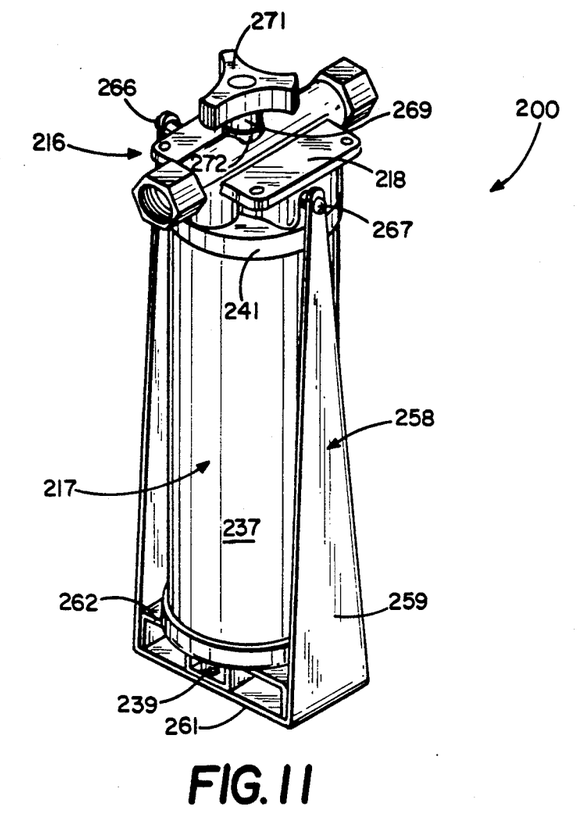
FIG. 11 is a perspective view of a second modification of the filter assembly of the invention.
Figure 12:
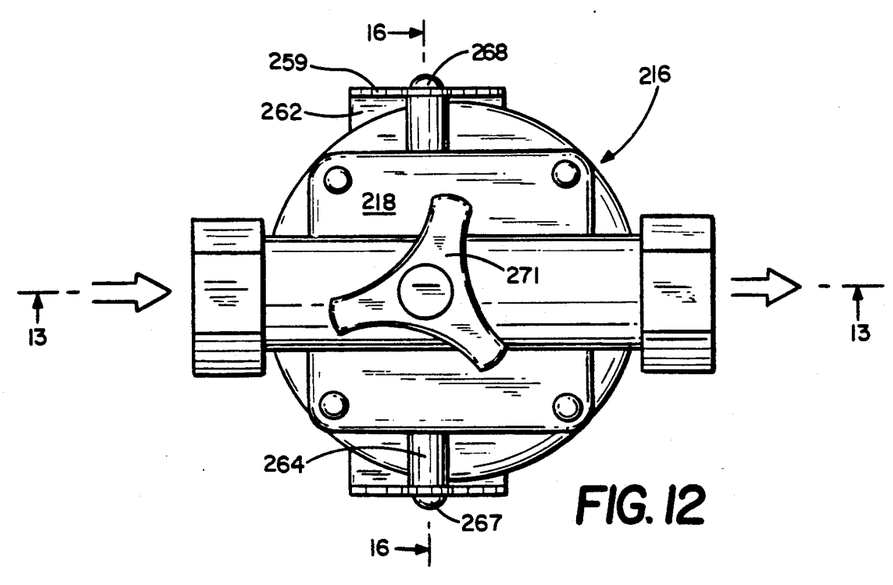
FIG. 12 is an enlarged top view of FIG. 11.

A second modification of the filter and manifold assembly indicated generally at 200 as shown in FIGS. 11 to 17. The parts of filter and manifold assembly 200 that corresponds to the parts of filter and manifold assembly 10 has the same reference number with the prefix 2. As shown in FIGS. 11 and 12. Filter and manifold assembly 200 has a manifold 216 supporting a removeable filter cartridge 217. Filter and manifold assembly 200 is used with fluids including water and gas for removing foreign matter including chemicals, minerals, salts, particulates, sediments, and odors that may be present in the fluids. Manifold 216 has a one-piece plastic housing 218 having an inlet passage 219 with a threaded open inlet end 221. The opposite side of housing 218 has an outlet passage 222 with an outlet threaded end 223. Pipes having shut off valves (not shown) are threaded into the ends 221 and 223 to control the flow of fluid into and out of manifold 216. Other types of valves can be used to block the flow of fluid to manifold 216. For example, the shut off valves can be incorporated within manifold 216.

Figure 13:
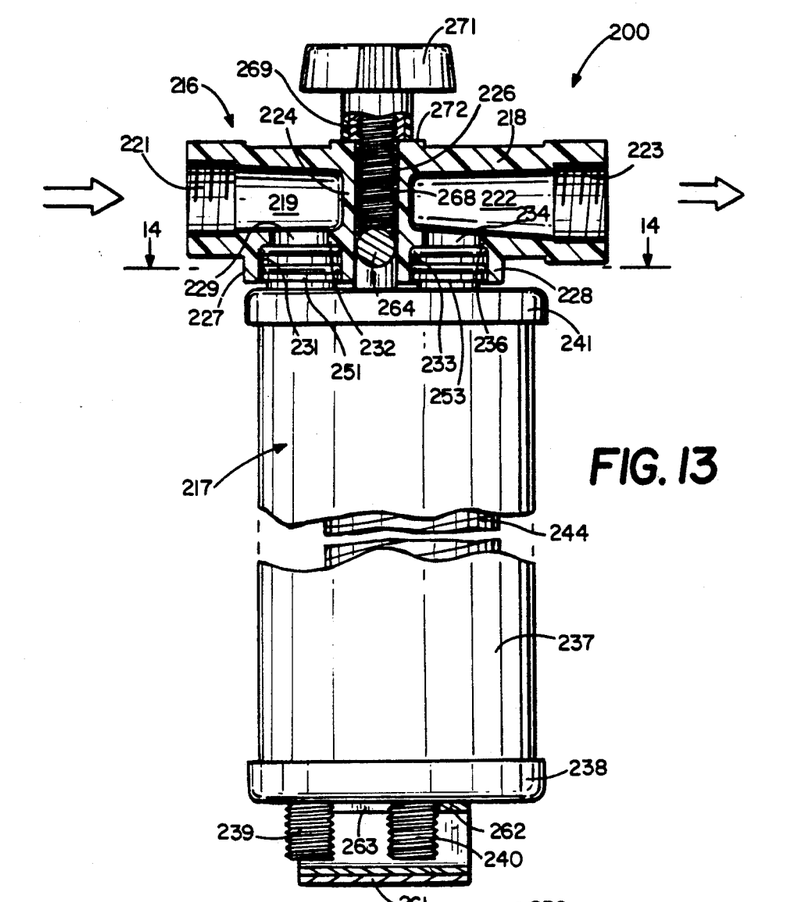
FIG. 13 is an enlarged sectional view taken along the line 13—13 of FIG. 12 with a foreshortened filter cartridge.
Figure 14:
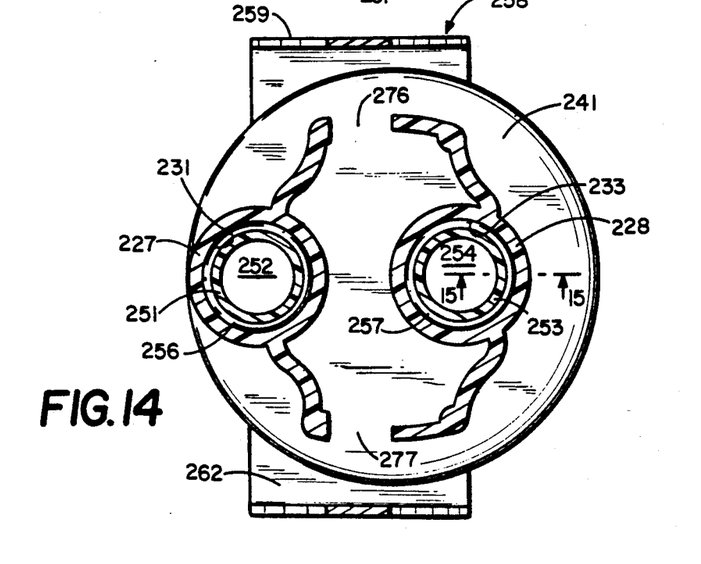
FIG. 14 is a sectional view taken along the line 14—14 of FIG. 13.

As shown in FIG. 13, passages 219 and 222 are separated with a central wall 224 having an upright hole 226. Opposite sides of wall 224 separate hole 226 from passages 219 and 222 so that hole 226 is not open to passages 219 and 222. The bottom of housing 218 has a first circular flange 227 laterally spaced from a second circular flange 228. An inlet port 229 connects passage 219 to a circular pocket or recess 231 surrounded by flange 227. Flange 227 has a continuous smooth inside cylindrical surface which forms pocket 231. Pocket 231 is axial alignment with port 229 and has a diameter greater than the diameter of port 229. An annular shoulder 232 separates cylindrical surface of flange 227 from port 229. The axis of pocket 231 is parallel to the axis of hole 226. The second cylindrical flange 228 is laterally spaced from the first flange 227 as shown in FIG. 14. Flange 228 has a continuous smooth inside cylindrical surface that surrounds a recess or pocket 233. An outlet port 234 connects outlet passage 222 with pocket 233. The inside cylindrical surface of flange 228 is in axial alignment with port 234 and has a diameter greater than the diameter of port 234. An annular shoulder 236 separates cylindrical surface of flange 228 from port 234. The axis of pocket 233 is parallel to axis of hole 226 and pocket 231.

Figure 16:
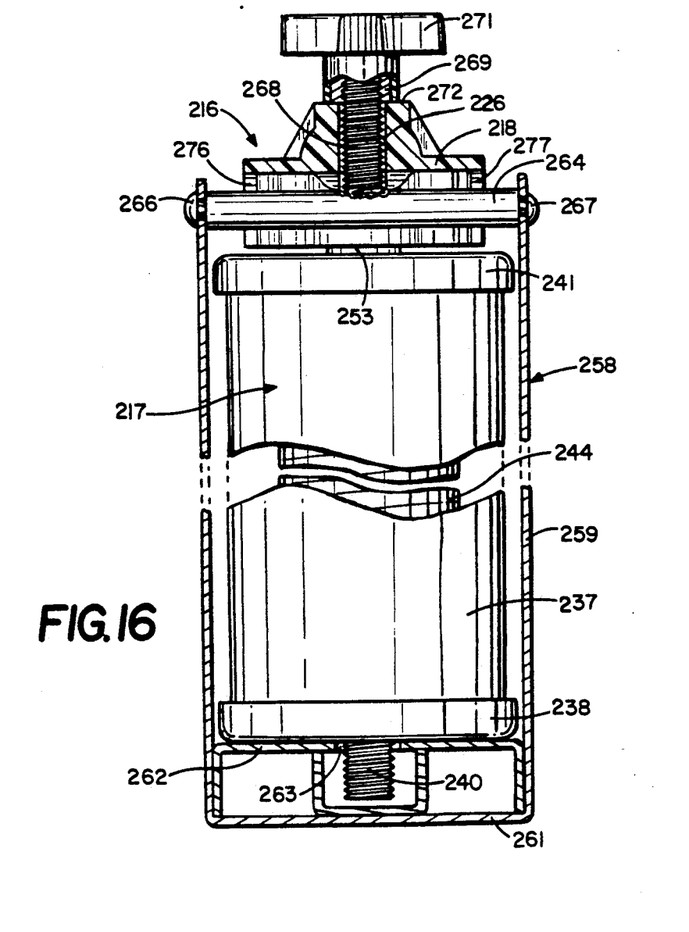
FIG. 16 is an enlarged foreshortened sectional view taken along the lines 16—16 of FIG. 12.

Referring to FIGS. 13 and 16, filter cartridge 217 has a cylindrical casing 237 shown as an elongated transparent cylindrical sleeve which can be made of transparent plastic, glass or the like. A cup-shape base or first end member 238 is secured to the bottom of casing 237. A pair of threaded bosses 239 and 240 project downwardly from the bottom of base 238. Bosses 239 and 240 may have blind holes that can be drilled to provide passages into the interior chamber of casing 237. Boss 239 is used to drain the fluid externally of filter 244. Boss 240 is used to drain the fluid within filter 244. Caps (not shown), such as cap 177 shown in FIG. 10, can be turned on the threaded bosses 239 and 240 to close the holes therein.

Figure 15:
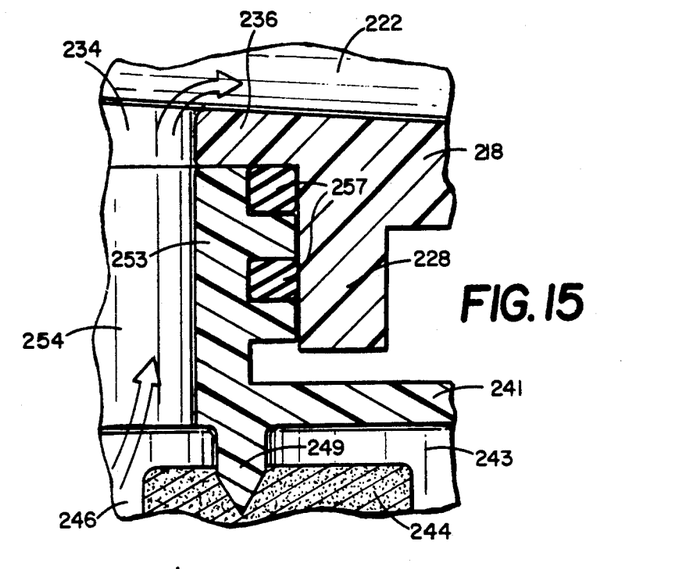
FIG. 15 is an enlarged sectional view taken along the line 15—15 of FIG. 14.

The top of casing 237 is closed with a second end or top member 241. As seen in FIG. 15, top member 241 has a downwardly directly annular rib 249 that projects into tubular filter 244 located within casing chamber 243. The opposite ends of filter 244 are retained in fixed relation relative to bottom member 238 and top member 241 with annular ribs and cylindrical bosses such as shown in FIGS. 4 and 10. The material of filter 244 can be granular activated carbon, powdered activated carbon, fabric, cotton, paper, plastic, metal, and like filtering materials. The material of filter 244 is selected for the product, chemicals or odors that are to be separated from the fluid flowing through the filter cartridge 217.

The top member 241 has a pair of upwardly directed cylindrical bosses or tubular members 251 and 253 laterally spaced from each other so that they fit into pockets 231 and 233, as seen in FIG. 13, of manifold 216. The diameters of tubular members 251 and 253 are slightly smaller than the diameters of the inside cylindrical surfaces of the cylindrical flanges 227 and 228, as seen in FIGS. 13 and 15. The diameters of bosses 251 and 253 and corresponding pockets 231 and 233 can be different to ensure correct installation of filter cartridge 217 on manifold 216. Tubular member 251 has a passage 252 open to the interior chamber 243 of casing 237. Tubular member 253 has a passage 254 open to the chamber 243 of casing 237. A pair of O-rings 256 surround tubular member 251 and are located in sealing engagement with the inside cylindrical surface of circular flange 227 and the annular shoulder 232. A pair of O-rings 257 are mounted on the tubular member 253 in sealing engagement with the inside surface of cylindrical flange 228 and the annular shoulder 236, as seen in FIG. 15. The upper O-rings 256 and 257 are held under axial compression against shoulders 232 and 236 by the releasable connector assembly 258 hereinafter described. This increases the sealing effectiveness of O-rings 256 and 257.

Figure 17:
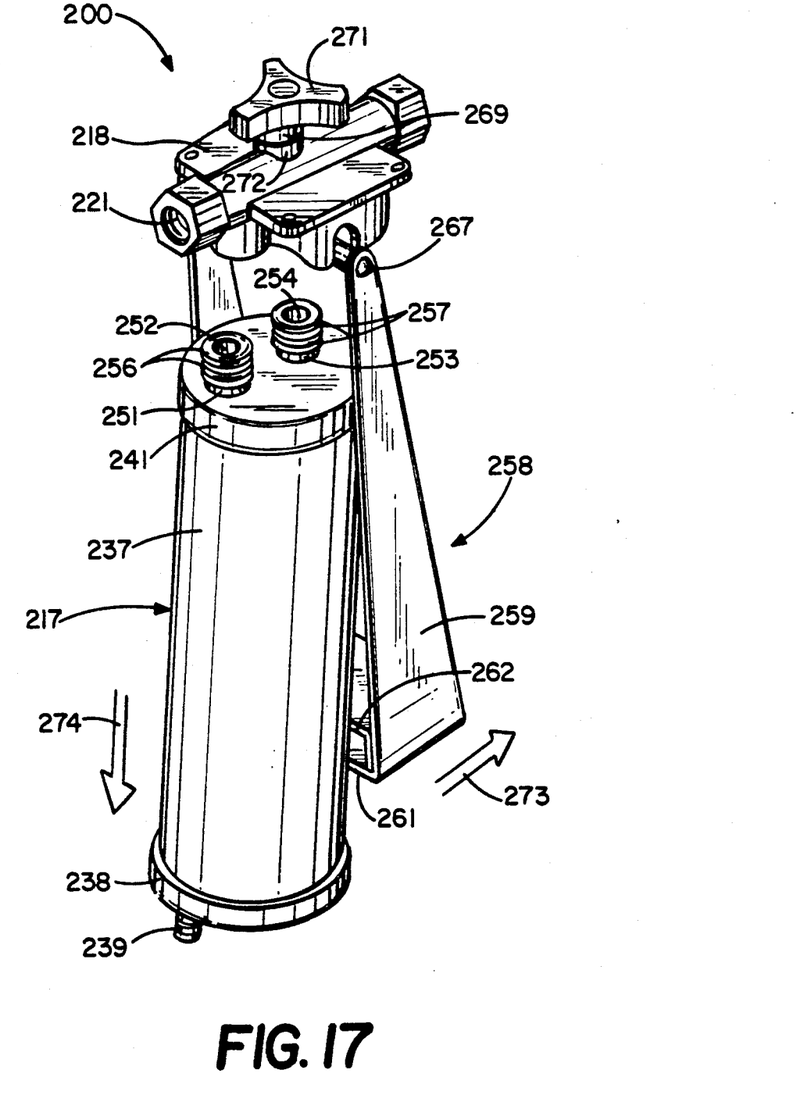
FIG. 17 is a perspective view showing the removal of the filter cartridge from the manifold.

Filter cartridge 217 is held in firm sealing relationship with manifold 216 with a releasable connector assembly indicated generally at 258. FIG. 11 shows the releasable connector assembly 258 in the retaining or holding position. FIG. 17 shows the releasable connector assembly 258 in the release or disconnect position whereby filter cartridge 217 can be removed from manifold 216 and replaced with a new filter cartridge.

Releasable connector assembly 258 has a U-shape member or yoke 259 having a bottom 261 supporting a platform 262. Platform 262 is adapted to engage the bottom surface of bottom member 238, as seen in FIGS. 7 and 16. Platform 262 has a transverse slot 263 accommodating threaded bosses 239 and 241, as seen in FIG. 13. The upper ends of yoke 258 are secured to a transverse bar 264 with pins or fasteners 266 and 267. The mid section of bar 264 is connected to an upwardly directed threaded post or bolt 268. Bolt 268, as shown in FIGS. 16, extends upwardly through hole 226 in the center part of manifold housing 218. A nut 269 threaded onto bolt 268 engages the top of boss 272 of housing 218. A hand knob 271 secured to nut 269 is used to turn nut 269 thereby move releasable connector assembly 258 along with filter cartridge 217 upwardly into firm engagement with manifold 216. The upper O-rings 256 and 257 are held in tight axial compression sealing engagement with annular shoulders 232 and 236 of housing 218. The opposite portions of rod 264 are free to move upwardly into slots or grooves 276 and 277 in the bottom of housing 218 between the circular flanges 227 and 228, as shown in FIG. 14.

Referring to FIG. 17, when knob 271 is turned to release nut 269 from bolt 268, the yoke 259 is lowered relative to manifold 216 so that yoke 259 can be swung in a direction of the arrow 273 from under filter cartridge 217. Filter cartridge 217 can then be moved straight down as indicated by the arrow 247 to disconnect tubular members 251 and 253 from housing 218. A new filter cartridge can then be moved up into the pockets 231 and 233. Filter cartridge is not turned or twisted as it is moved into engagement with housing 218. Yoke 259 is then moved under bottom member 238 of the filter cartridge 217. Nut 271 is then turned to tighten nut 269 on bolt 268 and thereby draw filter cartridge 217 into tight firm and sealing engagement with manifold 216.

There has been shown and described embodiments of the manifold and filter cartridge of the invention. Variations, modifications, changes in size and materials may be made by one skilled in the art without departing from the invention. The invention is defined in the following claims.

What is claimed is:

1. A manifold and filter assembly for filtering a fluid comprising: a housing having a fluid inlet passage and a fluid outlet passage, wall means separating the inlet passage from the outlet passage, said wall means having a hole separated from said passages extended through the wall means, said hole open to top and bottom sides of the housing and having an axis, a first flange having a first cylindrical inside surface surrounding a first pocket having an axis generally parallel to the axis of said hole, an inlet port in said housing open to the inlet passage and the first pocket, a second flange having a second cylindrical inside surface surrounding a second pocket having an axis generally parallel to the axis of said hole, an outlet port in said housing open to the outlet passage and said second pocket, a filter cartridge mounted on said housing having a chamber for receiving fluid from said inlet passage, filtering said fluid, and directing said fluid toward the outlet passage, said cartridge having filter means located in said chamber for filtering said fluid, said filter cartridge including a first tubular member having a passage open to the filter means, first seal means mounted on the first tubular member located in sealing engagement with the first inside surface of the first flange when the first tubular member is located in the first pocket and the passage therein is aligned with the inlet port, said filter cartridge including a second tubular member having a passage open to the filter means, second seal means mounted on the second tubular member located in sealing engagement with the second inside surface of the second flange when the second tubular member is located in the second pocket and the passage therein is aligned with the outlet port, post means extended through said hole in the housing, and means connected to the cartridge cooperating with the post means and housing to retain the first and second tubular members in the first and second pockets and maintain the first and second seal means in sealing relation with the first and second inside surfaces.

2. The assembly of claim 1 wherein: said cartridge includes a sleeve surrounding a chamber, said filter means being located in said chamber, said sleeve having an end, and an end member mounted on said end of the sleeve, said first and second tubular members being joined to the end member, and said post means being joined to the end member.

3. The assembly of claim 1 wherein: the first and second seal means each includes at least one O-ring.

4. The assembly of claim 3 wherein: said first and second tubular members have grooves accommodating said O-rings.

5. The assembly of claim 1 wherein: said post means is located between said first and second tubular members.

6. The assembly of claim 5 wherein: the lateral distance between the axis of the post means and the axis of the first tubular member is greater than the lateral distance between the axis of the post means and the axis of the second tubular member.

7. The assembly of claim 1 wherein: said cartridge includes a transparent sleeve surrounding a chamber, said filter means being located in said chamber whereby the filter means can be visually inspected.

8. The assembly of claim 1 wherein: said cartridge includes a sleeve surrounding a chamber, said sleeve having first and second ends, a first end member secured to the first end of the sleeve, a second end member secured to the second end of the sleeve, said filter means located in said chamber and extended between said first and second end members, means on the first end member engagable with said filter means to locate the filter means relative to the first end member, means on the second end member engagable with the filter means to locate the filter means relative to the second end member, said filter means having a filter passage open to the second end member, said second end member being joined to said first and second tubular members and said post means.

9. The assembly of claim 8 wherein: the filter means comprises an elongated cylindrical filter having said filter passage.

10. The assembly of claim 9 wherein: the means on the first end member engagable with the filter means comprises annular rib means engagable with said cylindrical filter.

11. The assembly of claim 9 wherein: the means on the second end member engagable with the filter means comprises annular rib means engagable with said cylindrical filter.

12. The assembly of claim 9 wherein: the means on the first end member engagable with the filter means comprises first annular rib means engagable with one end of the cylindrical filter, and the means on the second end member engagable with the filter means comprises second annular rib means engagable with the other end of the cylindrical filter.

13. The assembly of claim 1 wherein: said housing has annular shoulders surrounding the inlet port and outlet port, said tubular members having ends engagable with said shoulders when the cartridge is mounted on the manifold.

14. The assembly of claim 1 including: at least one boss joined to said cartridge, said boss having a hole adapted to be opened to the chamber of the cartridge to drain fluid therefrom.

15. The assembly of claim 1 wherein: the means cooperating with the post means includes a transverse bar secured to the post means, yoke means attached to the bar, and means mounted on the post means for holding the post means on the housing, said yoke engagable with the filter cartridge to hold the first and second tubular members in the first and second pockets and the first and second seal means under axial compression when the post means is mounted on the housing.

16. The assembly of claim 15 wherein: the filter cartridge has a bottom end, the yoke means is a U-shaped member having a bottom wall engagable with the bottom end of the filter cartridge, and pivot means securing the U-shaped member to said bar whereby the U-shaped member can be moved to locate the bottom wall away from the bottom end of the filter cartridge to permit removal of the filter cartridge from the housing.

17. A manifold and filter assembly for filtering a fluid comprising: a housing having a fluid inlet passage and a fluid outlet passage, wall means separating the inlet passage from the outlet passage, said wall means having at least one hole means separated from said passages extended through the wall means, said housing having a plurality of cylindrical inside surfaces surrounding pockets, port means in said housing open to said passages and said pockets allowing fluid to flow between said passages and pockets, filter cartridge means mounted on said housing having a chamber for receiving fluid from at least one of said passages, filtering said fluid, and directing said fluid to at least another of said passages, said cartridge means having filter means located in said chamber for filtering said fluid, said filter cartridge means including tubular members adapted to fit into said pockets having passages open to the chamber, seal means associated with the tubular members located in sealing engagement with the inside surfaces of the housing when the tubular members are located in the pockets and the passages in the tubular members are aligned with said port means, holding means connected to the cartridge means extended through said hole means in the housing, and means cooperating with the holding means and housing to retain the tubular members in the pockets.

18. The assembly of claim 17 wherein: said cartridge includes a sleeve surrounding said chamber, said sleeve having an end, and an end member mounted on said end of the sleeve, said tubular members and holding means being joined to the end member.

19. The assembly of claim 17 wherein: the seal means each includes at least one O-ring.

20. The assembly of claim 17 wherein: said holding means includes post means located between at least two of said tubular members.

21. The assembly of claim 20 wherein: the lateral distance between the post means and a first tubular member is greater than the lateral distance between the post means and a second tubular member.

22. The assembly of claim 17 wherein: said cartridge includes a transparent sleeve surrounding said chamber whereby said filter means located in said chamber can be visually inspected.

23. The assembly of claim 17 wherein: said cartridge means includes a sleeve surrounding said chamber, said sleeve having first and second ends, a first end member secured to the first end of the sleeve, a second end member secured to the second end of the sleeve, said filter means located in said chamber and extended between said first and second end members, means on the first end member engagable with said filter means to locate the filter means relative to the first end member, means on the second end member engagable with the filter means to locate the filter means relative to the second end member, said second end member being joined to said tubular members and said holding means.

24. The assembly of claim 17 wherein: said housing has annular shoulders surrounding the port means, said tubular members having ends engagable with said shoulders when the cartridge means is mounted on the housing.

25. The assembly of claim 17 including: at least one boss joined to the cartridge means, said boss having a hole adapted to be opened to said chamber of the cartridge means to drain fluid therefrom.

26. The assembly of claim 17 wherein: the holding means includes means releasably engagable with the filter means to allow the filter means to be removed from the housing.

27. The assembly of claim 17 wherein: the holding means includes a post extended through said hole in the housing, and a bar secured to the post, and a yoke attached to the bar, said yoke engagable with the filter means to hold the filter means in assembled relation with the housing and the seal means under axial compression.

28. The assembly of claim 27 wherein: the filter means has a bottom end, the yoke is a U-shaped member having a bottom wall engagable with the bottom end of the filter means, and pivot means securing the U-shaped member to said bar whereby the U-shaped member can be moved to locate the bottom wall away from the bottom end of the filter means to permit removal of the filter means from the housing.

29. A manifold and filter assembly for filtering a fluid comprising: a housing having a fluid inlet passage and a fluid outlet passage, wall means separating the inlet passage from the outlet passage, said housing having a plurality of cylindrical inside surfaces surrounding pockets, port means in said housing open to said passages and said pockets allowing fluid to flow between said passages and pockets, filter cartridge means mounted on said housing having a chamber for receiving fluid from at least one of said passages, filtering said fluid, and directing said fluid to at least another of said passages, said cartridge means having filter means located in said chamber for filtering said fluid, said cartridge means including tubular members adapted to fit into said pockets having passages open to the chamber, and seal means between the tubular members and the cylindrical inside surfaces of the housing when the tubular members are located in the pockets and the passages in the tubular members are aligned with said port means, and post means located between at least two of said tubular members connected to said cartridge means for holding the filter cartridge means on the housing with said seal means under compression.

30. The assembly of claim 29 wherein: said cartridge includes a sleeve surrounding said chamber, said sleeve having an end, and an end member mounted on said end of the sleeve, said tubular members and means holding the cartridge means on the housing being joined to the end member.

31. The assembly of claim 29 wherein: the seal means each includes at least one O-ring.

32. The assembly of claim 31 including grooves in the tubular member accommodating the O-rings.

33. The assembly of claim 29 wherein: the lateral distance between the post means and a first tubular member is greater than the lateral distance between the post means and a second tubular member.

34. The assembly of claim 33 wherein: said cartridge includes a sleeve surrounding a chamber, said sleeve having first and second ends, a first end member secured to the first end of the sleeve, a second end member secured to the second end of the sleeve, said filter means located in said chamber and extended between said first and second end members, means on the first end member engagable with said filter means to locate the filter means relative to the first end member, means on the second end member engagable with the filter means to locate the filter means relative to the second end member, said second end member being joined to said tubular members and said post means.

35. The assembly of claim 29 wherein: said housing has annular shoulders surrounding the port means, said tubular members having ends engagable with said shoulders when the cartridge means is mounted on the housing.

36. The assembly of claim 29 wherein: the means holding the filter means on the housing include a releasably connector assembly operable to allow the filter means to be removed from the housing.

37. A manifold and filter assembly for filtering a fluid comprising: a housing having a fluid inlet passage and a fluid outlet passage, wall means separating the inlet passage from the outlet passage, said housing having a plurality of cylindrical inside surfaces surrounding pockets, port means in said housing open to said passages and said pockets allowing fluid to flow between said passages and pockets, filter cartridge means mounted on said housing having a chamber for receiving fluid from at least one of said passages, filtering said fluid, and directing said fluid to at least another of said passages, said cartridge means having filter means located in said chamber for filtering said fluid, said filter cartridge means including tubular members adapted to fit into said pockets having passages open to the chamber, and seal means between the tubular members, and the cylindrical inside surfaces of the housing when the tubular members are located in the pockets and the passages in the tubular members are aligned with said port means, and means connected to said cartridge means holding the filter cartridge means on the housing with said seal means under compression, said means holding the filter means on the housing including a releasably connector assembly operable to allow the filter means to be removed from the housing, the releasable connector assembly includes a bar located between the housing and filter means, means connecting the bar to the housing, and a yoke attached to the bar, said yoke engagable with the filter means to hold the filter means in assembled relation with the housing and the seal means under axial compression.

38. The assembly of claim 37 wherein: the filter means has a bottom end, the yoke is a U-shaped member having a bottom wall engagable with the bottom end of the filter means, and pivot means securing the U-shaped member to said bar whereby the U-shaped member can be moved to locate the bottom wall away from the bottom end of the filter means to permit removal of the filter means from the housing.

39. A filter cartridge comprising: a sleeve surrounding a chamber, said sleeve having first and second ends, first end member secured to the first end of the sleeve, a second end member secured to the second end of the sleeve, filter means located in said chamber and extended between said first and second end members, means on the first end member engagable with said filter means to locate the filter means relative to the first end member, means on the second end member engagable with the filter means to locate the filter means relative to the second end member, said filter means having a filter passage open to the second end member, said second end member including a first tubular member having a first passage open to said chamber, and a second tubular member having a second passage open to the filter passage, first seal means surrounding and mounted on the first tubular member, second seal means surrounding and mounted on the second tubular member and post means mounted on the second end member between the first and second tubular members for connection to a manifold for carrying fluid to and from said chamber.

40. The filter cartridge of claim 39 wherein: the tubular sleeve is transparent whereby the filter can be visually inspected.

41. The filter cartridge of claim 39 wherein: the filter means comprises an elongated cylindrical filter having said filter passage.

42. The filter cartridge of claim 41 wherein: the means on the first end member engagable with the filter means comprises annular rib means engagable with said cylindrical filter.

43. The filter cartridge of claim 41 wherein: the means on the second end member engagable with the filter means comprises annular rib means engagable with said cylindrical filter.

44. The filter cartridge of claim 41 wherein: the means on the first end member engagable with the filter means comprises first annular rib means engagable with one end of the cylindrical filter, and the means on the second end member engagable with the filter means comprises second annular rib means engagable with the other end of the cylindrical filter.

45. The filter cartridge of claim 41 wherein: the said first and second seal means each includes at least one O-ring.

46. The filter cartridge of claim 45 wherein: said first and second tubular members have grooves accommodating said O-rings.

47. The filter cartridge of claim 39 wherein: the lateral distance between the post means and the first tubular member is greater than the lateral distance between the post means and the second tubular member.

48. The filter cartridge of claim 39 including: at least one boss joined to said first end member, said boss having a hole adapted to be opened to the chamber whereby fluid can be drained from said chamber.

* * * * *